United States Patent
Kanfi

(10) Patent No.: US 9,286,320 B2
(45) Date of Patent: Mar. 15, 2016

(54) SYSTEM AND METHOD FOR MAINTAINING CONSISTENCY AMONG METADATA ELEMENTS OF FILESYSTEM'S LOGICAL OBJECTS

(71) Applicant: Infinidat Ltd., Hertzelia (IL)

(72) Inventor: Arnon Kanfi, Tel Aviv (IL)

(73) Assignee: INFINIDAT LTD., Hertzelia (IL)

( * ) Notice: Subject to any disclaimer, the term of this patent is extended or adjusted under 35 U.S.C. 154(b) by 172 days.

(21) Appl. No.: 13/787,023

(22) Filed: Mar. 6, 2013

(65) Prior Publication Data

US 2014/0258242 A1    Sep. 11, 2014

(51) Int. Cl.
*G06F 17/30* (2006.01)
*G06F 11/14* (2006.01)

(52) U.S. Cl.
CPC .... *G06F 17/30227* (2013.01); *G06F 17/30091* (2013.01); *G06F 11/1435* (2013.01); *G06F 17/30156* (2013.01)

(58) Field of Classification Search
CPC ............ G06F 17/30067; G06F 17/30174; G06F 17/30569; G06F 11/1435; G06F 17/30088; G06F 17/30091; G06F 17/30144; G06F 17/30917; G06F 11/0727; G06F 11/2097
USPC .......... 707/690, 692, 822, 610, 649, 691, 639
See application file for complete search history.

(56) References Cited

U.S. PATENT DOCUMENTS

| | | | | |
|---|---|---|---|---|
| 7,707,193 B2 * | 4/2010 | Zayas et al. | | 707/691 |
| 7,941,709 B1 * | 5/2011 | Hong et al. | | 714/54 |
| 8,214,406 B2 * | 7/2012 | Kushwah | | 707/797 |
| 8,301,673 B2 * | 10/2012 | Hyer et al. | | 707/822 |
| 8,577,855 B2 * | 11/2013 | Shyam et al. | | 707/704 |
| 8,600,953 B1 * | 12/2013 | Gerber | | 707/687 |
| 8,626,713 B2 * | 1/2014 | Adkins et al. | | 707/639 |
| 8,671,072 B1 * | 3/2014 | Shah et al. | | 707/610 |
| 8,793,223 B1 * | 7/2014 | Cho et al. | | 707/690 |
| 9,020,987 B1 * | 4/2015 | Nanda et al. | | 707/821 |
| 2013/0138616 A1 * | 5/2013 | Gupta et al. | | 707/690 |

OTHER PUBLICATIONS

Rosenblum, Mendel et al., "The Design and Implementation of a Log-Structured File System," ACM Transactions on Computer Systems, vol. 10, No. 1, Feb. 1992, pp. 26-52.

McKusick, Marshall K. et al., "Soft Updates: A Technique for Eliminating Most Synchronous Writes in the Fast Filesystem," Proceedings of the FREENIX Track: 1999 USENIX Annual Technical Conference; Monterey, California, Jun. 1999.

* cited by examiner

*Primary Examiner* — Dangelino Gortayo
(74) *Attorney, Agent, or Firm* — Reches Patents

(57) ABSTRACT

A method for maintaining consistency among metadata elements (MDEs) of a logical object, includes: configuring a child MDE to include a correlation value uniquely indicative of a parent MDE. The parent MDE includes a reference to the child MDE; determining an order of performing at least two write operations included in a transaction related to the logical object: at least one write operation with respect to the parent MDE and at least one write operation with respect to the child MDE; the determined order assures that the child MDE is indicated as existing and includes the first correlation value, as long as the parent MDE exists; upon a first access to the parent MDE, subsequent to the transaction, verifying consistency between the parent MDE and the child MDE, using the first correlation value; and deleting the parent MDE if the verifying of consistency is unsuccessful.

18 Claims, 9 Drawing Sheets

```
┌─────────────────────────────────────────────────────────────────────────────┐
│ assigning to the parent metadata element an inconsistency indication, indicative of potential │
│    inconsistency between the parent metadata element and the child metadata element           │
│                                         510                                                   │
└─────────────────────────────────────────────────────────────────────────────┘

┌─────────────────────────────────────────────────────────────────────────────┐
│ configuring the child metadata element, associated with the logical object, to comprise a first │
│  correlation value uniquely indicative of a parent metadata element associated with the logical │
│                                       object                                                    │
│                                         520                                                     │
└─────────────────────────────────────────────────────────────────────────────┘
                                          ▼
┌─────────────────────────────────────────────────────────────────────────────┐
│ determining an order of performing at least two writing operations included in a transaction │
│ related to the logical object: at least one write operation with respect to the parent metadata │
│ element and at least one write operation with respect to the child metadata element; wherein │
│ the determined order assures that the child metadata element is indicated as existing and │
│   includes the first correlation value, as long as the parent metadata element exists │
│                                         530                                                   │
└─────────────────────────────────────────────────────────────────────────────┘
                                          ▼
┌─────────────────────────────────────────────────────────────────────────────┐
│          performing the at least two write operations according to the determined order       │
│                                         540                                                   │
└─────────────────────────────────────────────────────────────────────────────┘
                                          ▼
┌─────────────────────────────────────────────────────────────────────────────┐
│ upon performing a first access to the parent data element, subsequent to the transaction, │
│ verifying consistency between the parent metadata element and the child metadata element, │
│           using the first correlation value included in the child metadata element │
│                                         560                                                   │
└─────────────────────────────────────────────────────────────────────────────┘
         │                                                          │
    In case the                                              In case the verification
    verification fails                                       is successfull
         ▼                                                          ▼
┌──────────────────────────────┐              ┌──────────────────────────────────────┐
│ removing the first metadata element │              │ removing the inconsistency indication from │
│              570                     │              │           the parent metadata              │
│                                      │              │                  580                       │
└──────────────────────────────┘              └──────────────────────────────────────┘

SYSTEM AND METHOD FOR MAINTAINING CONSISTENCY AMONG METADATA ELEMENTS OF FILESYSTEM'S LOGICAL OBJECTS

FIELD OF THE PRESENTLY DISCLOSED SUBJECT MATTER

The presently disclosed subject matter relates to the field of maintaining consistency of a file system, and more particularly, to detecting and fixing consistency problems of metadata structures.

BACKGROUND OF THE INVENTION

A filesystem is a means for organizing data that is stored in a storage device, as a collection of files and directories. In order to present the data as a collection of files and directories, the filesystem maintains structures of metadata. The term metadata, in the context of a filesystem, refers to information that describes files and directories, but this information is not part of the stored data itself. For example, the following information items describe a file and are considered as part of the file's metadata: a file name, file size, creation time, last access/write time, user id, and block pointers that point to the actual data of the file on a storage device. Information items that constitute metadata of a directory mainly include names and references to files and sub-directories included in the directory.

Traditional filesystems utilize two principal data structures for managing metadata. One data structure is for maintaining file metadata, also known as 'inode' (Index node). The inode is a data structure that stores all the information about a regular file, directory, or other file system object. The inode is typically an entry in an inode table and is identified by an inode number, which is an index of an entry containing the inode, in the inode table. The second metadata structure is a directory, which is used for mapping file names to inode numbers. Directories generally include multiple sub-metadata structures called directory entries, each contains a tuple of a file-name and an inode-number.

A hard link is a directory entry that associates a filename with a file on a file system. Creating a hard link has the effect of creating multiple names for the same file. One inode can be pointed by multiple directory entries, including one directory for the original file and one or more directory entries of one or more physical links, wherein each directory entry includes a different file name but the same inode number. Each directory entry may reside under a different directory.

Filesystem integrity in case of a crash is an issue that filesystem designers had to deal with for many years. Early filesystems did not address this issue properly and relied on running an integrity checking program periodically, usually during boot. Modern filesystems address this issue in various ways.

Consistency problems, related to metadata structures, may occur when an inode is not pointed by a directory entry, or otherwise, stale directory entries may point to free inodes or worse, point to the wrong inodes, creating a security hazard and may cause unexpected problems.

The following approaches have been used for maintaining integrity of metadata:

1. Most filesystems use a journal to guarantee atomicity, when performing file operations that involve changes to more than one metadata structure. The journal records the transaction to be executed, before the inode and the directory entry are committed to disk. The incomplete transactions recorded in the journal may be replayed or rolled back after a crash. Journals have the disadvantage of increasing filesystem operation latency and performing additional I/O operations required for generating and writing the transaction to the journal file.

2. An alternative to journaling that uses specialized hardware is the use of NVRAM (Non-Volatile RAM) or a system with UPS that guarantees that changes are not lost after a crash or a power failure.

3. Soft updates is another alternative to journaling filesystem. This technique that was invented by Marshall Kirk McKusick and Gregory R Ganger ("Soft Updates: A Technique for Eliminating Most Synchronous Writes in the Fast Filesystem", Proceedings of the FREENIX Track: 1999 USENIX Annual Technical Conference, Monterey, Calif., USA, Jun. 6-11, 1999) and was implemented as part of the FFS filesystem on BSD4.4. This technique tries to guarantee that I/O operations are performed in a certain way that ensures that there are never references to invalid data (like a directory entry, which points to a wrong or missing inode). The ordering constraints rule defines that a structure is never pointed to before it has been initialized (e.g., an inode must be initialized before a directory entry points to it). According to this publication, soft updates have better performance than journaling.

4. Log-structured filesystems implement the filesystem as a log and eliminate the need to write to an external log as well as to the directory and inodes. Log structured filesystems were invented by John Ousterhout' as part of the experimental Sprite operating system in the mid-1980s. Log-structures filesystem may make reads much slower, since it fragments files that conventional file systems normally keep contiguous with in-place writes.

Some file systems are programmed to run consistency checks in order to obtain consistency of the file system after a system failure. Typically, after the system restarts and before the file system is mounted for read and write access, the file system executes a complete walk through the file system's data structures. For example, Linux and UNIX systems use fsck (file system consistency check) command to check file system consistency and repair it, while Microsoft Windows equivalent commands are CHKDSK and SCANDISK. This process is time and resource consuming.

SUMMARY

In accordance with certain aspects of the presently disclosed subject matter, there is provided a method for maintaining consistency among metadata elements (MDEs) of a logical object, the method includes using a processor to perform the following steps, the processor is operatively coupled to a non-volatile storage space accessible by the processor and configured to store the MDEs: a) configuring a child MDE, associated with a logical object, to comprise a first correlation value, uniquely indicative of a parent MDE associated with the logical object, wherein the parent MDE includes a reference to the child MDE; b) performing at least two write operations included in a transaction related to the logical object: at least one write operation with respect to the parent MDE and at least one write operation with respect to the child MDE; wherein an order of performing the at least two write operations is determined such that write operations for creating the parent MDE precede write operations related to creating the first correlation value, while write operations related to deleting the parent MDE succeed write operations related to deleting the first correlation value; and c) upon a first access to the parent MDE, subsequent to the transaction, verifying consistency between the parent MDE and the child MDE, using the first correlation value; and deleting the parent MDE if the verifying of consistency is unsuccessful.

Optionally, the method can further include, before performing the at least two write operations, assigning to the parent MDE an inconsistency indication, indicative of potential inconsistency between the parent MDE and the child MDE; and wherein the verifying of consistency is performed in case where the parent MDE includes the inconsistency indication. In case of successfully verifying the consistency, the method can include removing the inconsistency indication from the parent MDE.

In accordance with further aspects of the presently disclosed subject matter, the parent MDE is a directory entry and the child MDE is an inode.

In accordance with further aspects of the presently disclosed subject matter, the verifying of consistency is provided in response to scanning a directory that includes the directory entry.

In accordance with further aspects of the presently disclosed subject matter, the method further includes configuring the parent MDE to comprise a second correlation value that is correlated to the first correlation value. The consistency between the parent MDE and the child MDE can considered as unsuccessfully verified if the first correlation value does not match the second correlation value.

In accordance with further aspects of the presently disclosed subject matter, the step of configuring is performed as part of a transaction selected from: a logical object creation, a hard link creation and a logical object moving.

In accordance with further aspects of the presently disclosed subject matter, the step of configuring is performed as part of an inode creation operation and the step of configuring includes configuring the inode to comprise the first correlation value.

In accordance with further aspects of the presently disclosed subject matter, the transaction is for creating the logical object, wherein the step of determining the order of performing the write operations includes determining that a creation operation of the directory entry in a non-volatile storage space is performed before a creation operation of the inode in the non-volatile storage space.

In accordance with further aspects of the presently disclosed subject matter, the transaction is for deleting the logical object, wherein the step of determining the order of performing the write operations includes determining that a deletion operation of the directory entry from a non-volatile storage space is performed after a deletion operation of the inode from the non-volatile storage space.

In accordance with further aspects of the presently disclosed subject matter, the transaction is for moving the logical object, wherein the parent MDE is an old directory entry associated with the logical object and wherein the child metadata element is an inode; and wherein the step of determining the order of performing the write operations includes determining performing the following operations in the following order: (i) a creation operation of a new directory entry in a non-volatile storage space; (ii) replacing an old correlation value indicative of the old directory entry and included in the inode with a new correlation value indicative of the new directory entry and write the inode to the non-volatile storage space; and (iii) deleting the old directory entry from the non-volatile storage space.

In accordance with further aspects of the presently disclosed subject matter, the transaction is for adding a hard link that points to the logical object, wherein the parent MDE is a directory entry associated with the hard link and wherein the child metadata element is an inode associated with the logical object and the hard link; and wherein the step of determining the order of performing the write operations includes determining performing the following operations in the following order: (i) a creation operation of the directory entry in a non-volatile storage space; and (ii) adding the first correlation value indicative of the directory entry to the inode and writing the inode to the non-volatile storage space.

In accordance with further aspects of the presently disclosed subject matter, the first access to the parent MDE is a first access to the directory entry and provided responsive to scanning a directory that includes the directory entry.

In accordance with other aspects of the presently disclosed subject matter, there is provided a method for maintaining consistency among metadata elements of a logical object, including: upon creating a logical object, a) generating, in a non-volatile storage space, a directory entry associated with the logical object and configuring the directory entry to comprise: an inode identifier, a second correlation value; b) generating, in the non-volatile storage space, an inode associated with the inode identifier and with the logical object and comprising a first correlation value corresponding to the second correlation value; wherein the step of generating the inode is succeeding the step of generating the directory entry; and c) upon a first access to the directory entry, subsequent to the creating of the logical object, verifying consistency between the directory entry and the inode, by checking a match between the first correlation value and the second correlation value; and deleting the directory entry if the verifying of consistency is unsuccessful.

In accordance with further aspects of the presently disclosed subject matter, the step of generating the directory entry further includes configuring the directory entry to comprise an inconsistency indication indicative of potential inconsistency between the directory entry and an inode; and wherein the verifying of consistency is performed in case where the directory entry includes the inconsistency indication.

In accordance with further aspects of the presently disclosed subject matter, when deleting the logical object, the method includes freeing the inode before freeing the directory entry.

In accordance with further aspects of the presently disclosed subject matter, the method includes, when creating a hard link to the logical object, a) generating, in the non-volatile storage space, a new directory entry associated with the hard link and configuring the new directory entry to comprise the inode identification, a new second correlation value and an inconsistency indication indicative of potential inconsistency between the new directory entry and the inode; b) configuring the inode to comprise an additional first correlation value corresponding to the new second correlation value and writing the inode to the non-volatile storage space; wherein the step of configuring the inode is succeeding the step of generating the new directory entry; and c)upon a first access to the new directory entry, subsequent to the creating of the hard link, in case where the new directory entry comprises the inconsistency indication, verifying consistency between the new directory entry and the inode, by checking a match between the additional correlation value and the new second correlation value; and deleting the new directory entry if the verifying of consistency is unsuccessful.

In accordance with further aspects of the presently disclosed subject matter, the method includes, when removing the hard link, removing the additional first correlation value from the inode before freeing the new directory entry.

In accordance with further aspects of the presently disclosed subject matter, the method includes, when moving the logical object to another directory, a) generating a new directory entry associated with the logical object in the non-volatile storage space and configuring the new directory entry to comprise the inode identification, a new second correlation value and an inconsistency value indicative of potential inconsistency between the new directory entry and the inode; b) replacing in the inode, the first correlation value with a new first correlation value corresponding to the new second correlation value wherein the step of replacing is succeeding the step of generating; wherein the step of replacing is succeeding the step of generating; c) deleting from the non-volatile storage space, an old directory entry associated with the logical object; wherein the step of deleting is succeeding the step of replacing; and d) upon a first access to the new directory entry, subsequent to the moving, in case where the new directory entry comprises the inconsistency indication, verifying consistency between the new directory entry and the inode, by checking a match between the new first correlation value and the new second correlation value; and deleting the new directory entry if the verifying of consistency is unsuccessful.

In accordance with other aspects of the presently disclosed subject matter, there is provided a non-transitory computer storage medium having computer readable program code embodied therein for maintain consistency among parent metadata structures and child metadata structures associated with one or more logical objects, the computer program product includes computer readable program code for: a) configuring a child MDE, associated with a logical object, to comprise a first correlation value, uniquely indicative of a parent MDE associated with the logical object, wherein the parent MDE includes a reference to the child MDE; b) performing at least two write operations included in a transaction related to the logical object: at least one write operation with respect to the parent MDE and at least one write operation with respect to the child MDE; wherein an order of performing the at least two write operations is determined such that write operations for creating the parent MDE precede write operations related to creating the first correlation value, while write operations related to deleting the parent MDE succeed write operations related to deleting the first correlation value; and c) upon a first access to the parent MDE, subsequent to the transaction, verifying consistency between the parent MDE and the child MDE, using the first correlation value; and deleting the parent MDE if the verifying of consistency is unsuccessful.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 5 illustrates a generalized flowchart of maintaining consistency among metadata elements (MDEs) of logical objects, in accordance with certain embodiments of the presently disclosed subject matter.

DETAILED DESCRIPTION

In the following detailed description, numerous specific details are set forth in order to provide a thorough understanding of the disclosed subject matter. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "executing", "performing", "assigning", "configuring", "determining", "writing", "reading", "removing", "identifying", "verifying", "creating", "deleting", "generating", or the like, refer to the action and/or processes of a computer that manipulate and/or transform data into other data, said data represented as physical quantities, e.g. such as electronic quantities, and/or said data representing the physical objects. The term "computer" as used herein should be expansively construed to cover any kind of electronic device with data processing capabilities.

The operations in accordance with the teachings herein can be performed by a computer specially constructed for the desired purposes or by a general-purpose computer specially configured for the desired purpose by a computer program stored in a non-transitory computer readable storage medium.

Figure 1:
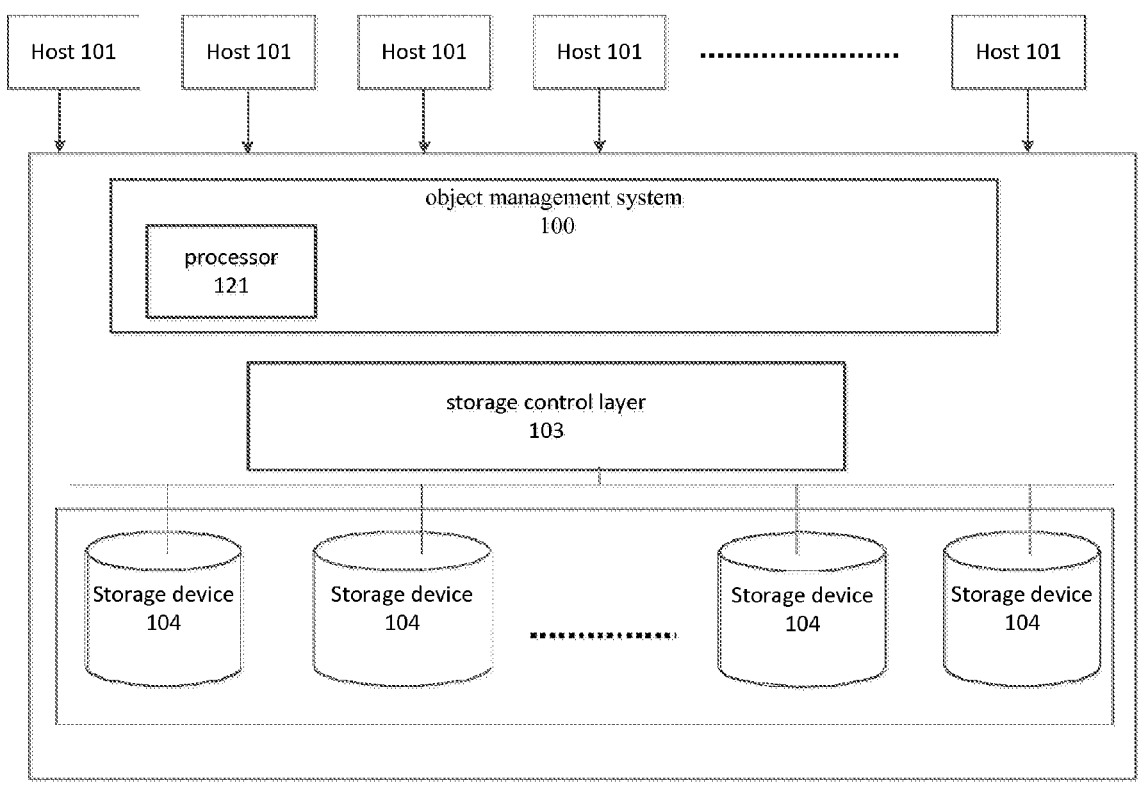
FIG. 1 illustrates a schematic functional block diagram of an object management system, in accordance with embodiments of the presently disclosed subject matter.

FIG. 1 illustrates a schematic block diagram of an object management system 100, for managing one or more filesystems and especially for managing metadata structures and maintaining the consistency of metadata structures of the filesystems, according to embodiments of the presently disclosed subject matter.

Metadata structures related to a certain logical object (e.g. a file) in the filesystem are often correlated, in a unilateral manner. Such a unilateral correlation can be seen in a metadata structure of a logical object that points or refers to another metadata structure of the same logical object. A non-limiting example of correlated metadata structures are: (i) a directory entry, which contains the filename and a reference to (ii) an inode. The reference is e.g. an inode number, which indicates an entry in the inode table. Generally, the inode does not include a reference back to the directory entry. Another example is an inode that points to an indirect block that contains offsets and storage locations related to the file data. Such correlated data structures will be referred hereinafter as: (i) a parent metadata structure (or parent metadata element), and (ii) a child metadata structure (or child metadata element), wherein the parent metadata structure is a structure that refers to the child metadata structure. The reference may be a pointer, an index in a table, or any other information indicative of a location of the child metadata structure. A directory entry is used hereinafter as an example of a parent directory, using an inode number as a reference to an inode. The inode is an example of a child metadata structure.

Maintaining the consistency of a filesystem, according to the teaching disclosed herein, is achieved by: (i) avoiding circumstances that can lead to some data inconsistencies.

Such data inconsistencies may occur upon an event of system crash in a middle of a transaction that involves updating two correlated data structures, such as: an inode and a directory entry that points to the inode; (ii) checking consistency between correlated metadata structures when performing routine operations during normal system operation; and (iii) seamlessly fixing detected inconsistencies during normal system operation and without interfering with the normal operation.

In order to avoid circumstances that can lead to metadata inconsistency, object management system 100 ensures that there are no orphan inodes (inodes that are not pointed by directories) after a system crash. On the other hand, object management system 100 is capable of handling stale directory entries, i.e., directory entries that point to non-existing inodes or wrong inodes. Such directory entries may exist temporarily, but are indicated as potentially inconsistent entries and are automatically detected and deleted, in the background, as part of other routine processes that read directories that may contain stale entries.

Since orphan inodes should be avoided, while object management system 100 is capable of handling stale directory entries, the following concept is implemented: a transaction that performs write operations that involve at least two metadata structures with a dependency between the two structures (e.g. a parent metadata structure and a child metadata structure) are performed in such an order that ensures that the parent metadata structure exists as long as the child metadata structure exists. For example: in an object deletion transaction, the parent metadata structure (e.g. directory entry) of the object can be deleted only after the child metadata structure (e.g. inode) is deleted, while in an object creation transaction, the parent metadata structure of the object is created before the child metadata structure is created. In other words: creation transactions add a directory entry, as a first step, and write to the new inode, as a second step, while deletion transactions delete the inode, as a first step, and delete the directory entry, as a second step. Thus, if a system failure occurs between the first step and the second step, there are no orphan inodes, but only stale directories that can be detected and deleted, as described hereinafter.

Object management system 100 is coupled, either directly or through a network, to one or more storage devices 104 that store the data and metadata of objects included in filesystems that are managed by object management system 100. Object management system 100 is also coupled, either directly or through a network, to hosts 101 and receives filesystem commands from hosts 101.

Object management system 100 includes at least one processing unit, such as processor 121, configured for: (i) receiving, from hosts 101, filesystem commands that involve writes to objects' metadata and especially commands that can influence the consistency of the metadata structures, such as: create, delete and rename object commands; (ii) creating and writing validation information required for detecting inconsistency problems in the metadata structures; and (iii) executing the filesystem commands received from hosts 101, while checking accessed directories for stale entries. The checking of stale entries is performed particularly as part of directory read, directory scan, lookup or any other command that involves reading directory entries.

Optionally, object management system 100 can communicate with storage devices 104 via a volume management layer, such as storage control layer 103, which is coupled to storage devices 104 constituting a physical storage space. According to another embodiment, storage control layer 103 may be included in object management system 100. Storage devices 104 are non-volatile storage devices, such as disk drives or SSD (Solid State Drive) and thus the physical storage space is a non-volatile storage space.

Storage control layer 103 can be operable to handle a virtual representation of the physical storage space and to facilitate mapping between the physical storage space and its virtual representation. In such cases, storage control layer 103 can be configured to create and manage at least one virtualization layer interfacing between object management system 100 (or other external applications and hosts) and the physical storage space. The virtualization functions may be provided in hardware, software, firmware or any suitable combination thereof.

The physical storage space may comprise any appropriate permanent storage medium and may include one or more disk units (DUs), also called "disk enclosures", including several disk drives. Storage control layer 103 and storage devices 104 may communicate in accordance with any appropriate storage protocol.

The physical storage space further includes a plurality of physical data blocks, each physical data block may be characterized by a pair ($DD_{id}$, DBA) where $DD_{id}$ is a serial number associated with the disk drive accommodating the physical data block, and DBA is a block number within the respective disk.

The entire address space of the storage system is divided into logical volumes, and each logical volume becomes an addressable device. A logical volume (LV) or logical unit (LU) represents a plurality of data blocks characterized by successive Logical Block Addresses (LBA). Different logical volumes may comprise different numbers of data blocks, which are typically of equal size within a given system (e.g. 512 bytes).

Each logical volume is used by object management system 100 for hosting a filesystem. The logical volume may be a portion of the physical storage space, e.g. a collection of physical data blocks from multiple storage devices, or alternatively, the logical volume may include the physical data blocks of one storage device or part of the physical data blocks of one storage device.

The logical volume stores all the filesystem objects' data. The metadata of the filesystem objects may be stored in a dedicated area of the volume, may be stored as a special file in the volume or may be stored in a dedicated region in the physical storage space.

Figure 2:
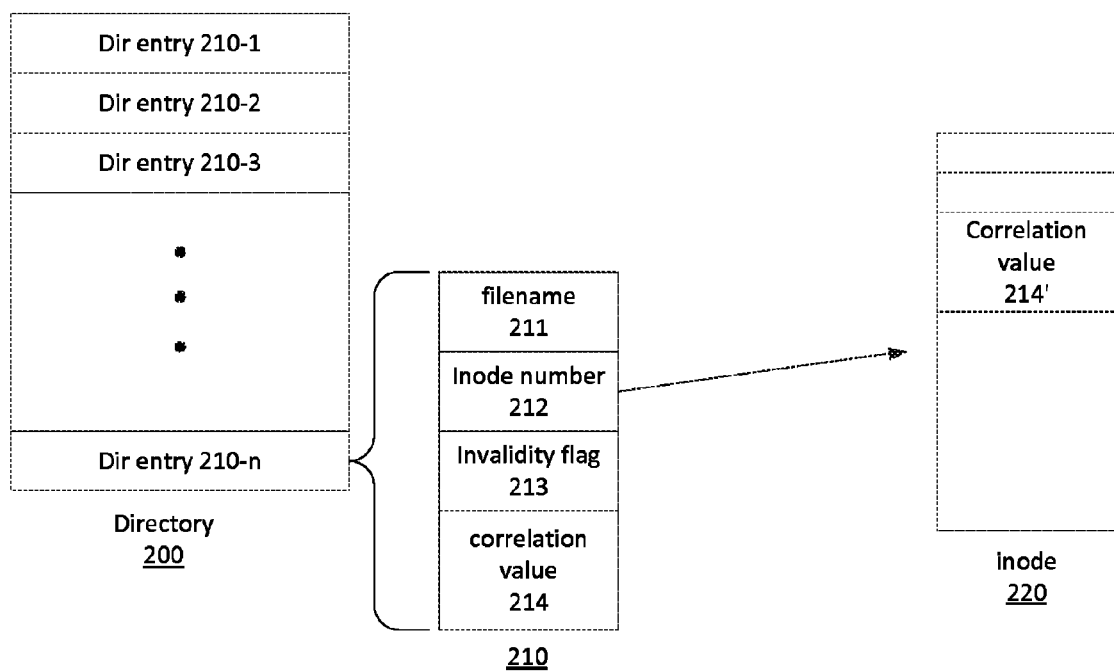
FIG. 2 is a schematic diagram illustrating an implementation example of directory entries that include validation information, in accordance with certain embodiments of the presently disclosed subject matter.

FIG. 2 illustrates a directory 200 having n directory entries 210-1-210-$n$, according to embodiments of the presently disclosed subject matter.

Each directory entry 210 includes information required for validating directory entry 210, in addition to traditional fields (e.g. inode number 212 and filename 211).

To achieve the ability to detect stale directory entries, validation information, is added to each directory entry 210, upon transactions that involve writing to both inodes and directory entries, e.g. creation, deletion and renaming transactions with regard to an object (e.g. a file, Access Control List (ACL) and the like) that is referred by the inode number in the directory entry. The validation information includes: a correlation value 214 and an inconsistency flag 213 (also referred to as inconsistency indication).

Inconsistency flag 213 indicates whether the directory entry is suspicious as invalid (e.g. the flag is set) or valid (e.g. the flag is zero). The inconsistency flag can be set upon each transaction that involves changes to both the inode and directory entry, to indicate that the directory entry needs to be checked for consistency upon the next access to the directory. The next access may take place after a system crash/power failure or during a normal system operation, though consistency problems are not expected in the latter case. Inconsistency flag 213 is reset when the next access to the directory confirms the validity of the directory entry. Inconsistency flag 213 and the correlation value 214 are written to the directory entry, as a preliminary step, before any other I/O operation to the inode or the directory entry or upon the first I/O operation (if the first I/O operation is directed to the directory entry).

Correlation value 214 is also written to inode 220, in addition to the traditional metadata fields. Correlation value 214 is a unique identifier that uniquely identifies a directory entry and the associated inode, and indicates the correlation between the two metadata items by writing the same correlation value to both the directory entry and the inode. Alternatively, two different correlation values can be written respectively to both metadata elements, wherein one correlation value is indicative of the second correlation value, for example, one correlation value can be infrared from the other correlation value. The correlation value is for verifying that the directory entry not only points to the inode, but points to the right inode. The correlation value may be implemented by using a global counter, which is incremented upon each assignment of a correlation value to a metadata structure, by using the high resolution CPU internal clock, by generating pseudo random numbers or by using any other techniques that provides unique values.

After completion of transactions that generates correlation values (e.g. creation or rename operations), on normal uninterrupted workflow, the same correlation value 214 is shared between inode 220 and directory entry 210 that refers to inode 220. If correlation value 214 in directory entry 210 is equal to (or matches) correlation value 214' in inode 220, then it ensures that a previous transaction on the object associated with inode 220 was completed successfully, without undergoing a system failure in the middle of the process. If correlation value 214 in directory entry 210 is not equal to (or does not match) correlation value 214' in inode 220, then it indicates that a previous transaction made on the object was not completed. For example: suppose the previous transaction was a file deletion, the inode was freed but the system crashed before the directory entry was removed, so the directory entry still refers to the freed inode. Meanwhile, after the system was powered up, the freed inode entry may be allocated to another new file and assigned with a different correlation value during the creation transaction. Another example of inconsistency that is detected by unmatched correlation values: the previous operation was a file creation, the directory entry was allocated for the new file and assigned with a correlation value and an inode number, but the system failed before an inode entry (referenced by the inode number) was initialized and assigned with the correlation value, so the inode entry pointed by the inode number in the stale directory entry includes an irrelevant correlation value and uninitialized metadata values. An alternative scenario for the latter example: an attempt to read the uninitialized inode results in a read failure, which also indicates inconsistency of the directory entry.

During a normal system operation, upon routine access to a directory (for e.g., displaying the directory content, scanning, or any other directory operation that involves accessing directory entries), each directory entry that is being accessed, is checked for the inconsistency flag. If the inconsistency flag indicates that the entry is suspicious as inconsistent (e.g. the flag is set), the inode is read. The inconsistency is definite in one of two cases: (i) the inode does not exist, which may be a result of a system failure that occurred upon e.g. file deletion, wherein the inode was deleted and then the system crashed before the directory entry was removed; and (ii) the correlation value written in the directory entry is different from the correlation value written in the inode. If the inconsistency flag indicates possible inconsistence but the correlation values in the directory entry and the inode match, the inconsistency flag is reset to indicate a valid directory entry. However, if an inconsistency is detected, the directory entry is deleted.

FIGS. 3A-3E illustrate different examples of conducting transactions that involve writes to at least two related metadata elements, e.g. an inode and a directory entry that refers to the inode. The operations described in FIGS. 3A-3E can be performed by processor 121.

Figure 3A:
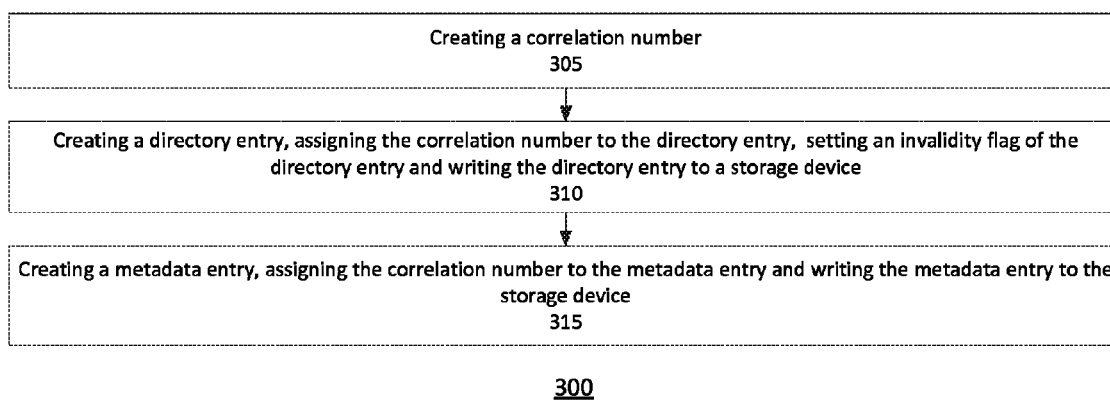
FIGS. 3A-3E illustrate generalized flowcharts of providing validation aids during various transactions, in accordance with certain embodiments of the presently disclosed subject matter.

FIG. 3A illustrates a set operations for creating (300) a logical object. The object to be created may be a file, an ACL, etc. The first operation 305 is for creating a correlation value. The correlation value is a unique number among all correlation values that currently exist in the filesystem. Operation 305 can include creating two correlation values, a first correlation value is to be included in the inode and the second correlation value is to be included in the directory entry. The two correlation values may be equal to each other or match each other in a different manner.

Operation 305 is followed by an operation 310 of generating a directory entry. The generating includes: configuring the directory entry to comprise the second correlation value and an inconsistency indication and writing the directory entry to a non-volatile storage space. The generating further includes assigning traditional fields to the directory entry, e.g.: filename and inode identifier.

Operation 310 is followed by an operation 315 of generating an inode associated with the object and with the directory entry, including: assigning to the inode the first correlation value that corresponds to the second correlation value and writing the inode to the non-volatile storage space. Note that operation 310 must precede operation 315, otherwise the inode may become orphan if a system failure occurs in the middle of the creation of the logical object. Other known in the art operations may be involved in the object creation 300, for example: changing the modification time of the directory and writing other fields to the inode.

The object creation 300 includes only two I/O operations (at operations 310 and 315) like conventional filesystems, but there is no need to perform journaling, which involves an additional I/O operation. Unlike many filesystems the order of operations is reversed (the directory entry is created before the inode).

Figure 3B:
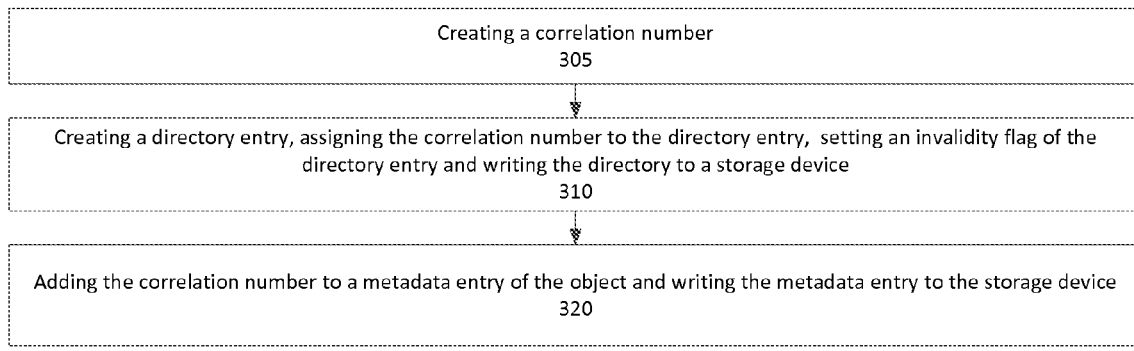

FIG. 3B illustrates a set operations 301 for creating a hard link to a logical object. Creating a hard link means adding a second name for the same file, or in other words, creating a new directory entry that points to an existing inode that represent the original object.

Creating the hard link set of operations 301 includes operations 305 and 310 as in object creation 300 for generating a new directory entry associated with the hard link and configuring the new directory entry to include a new second correlation value and inconsistency indication, in addition to the inode identifier. Creating a hard link is slightly different from creating a file/directory, because the inode of the original file/object already exists, and this inode serves the hard link, in addition to serving the original file. The inode of the original file may be linked to multiple hard links, therefore, instead of storing one correlation value, a correlation value list, with multiple correlation values, one for each hard link and one for the original file, may be stored in the inode. Creating the hard link 301 includes, instead of operation 315 of object creation 300, an operation 320 of adding an additional first correlation value (that corresponds to the new second correlation value) to the inode of the object and writing the inode to the non-volatile storage space. The adding may be adding the additional first correlation value to a correlation value list of the inode.

Figure 3C:
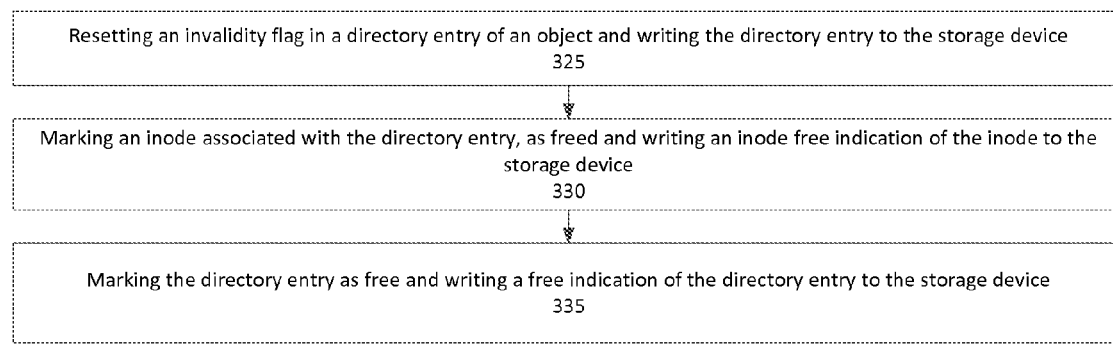

FIG. 3C illustrates a set of operations 302 for deleting an object. The first operation 325 is of setting an inconsistency indication in a directory entry of the object and writing the directory entry with the set inconsistency indication to the non-volatile storage space.

Operation 325 is followed by an operation 330 of deleting the inode, which may include marking an inode associated with the directory entry, as freed and writing a free indication of the inode to the storage space.

Operation 330 is followed by an operation 335 of deleting the directory entry, which may include marking the directory entry as free and writing a free indication of the directory entry to the storage space. Note that freeing the inode is performed before freeing the directory entry.

Figure 3D:
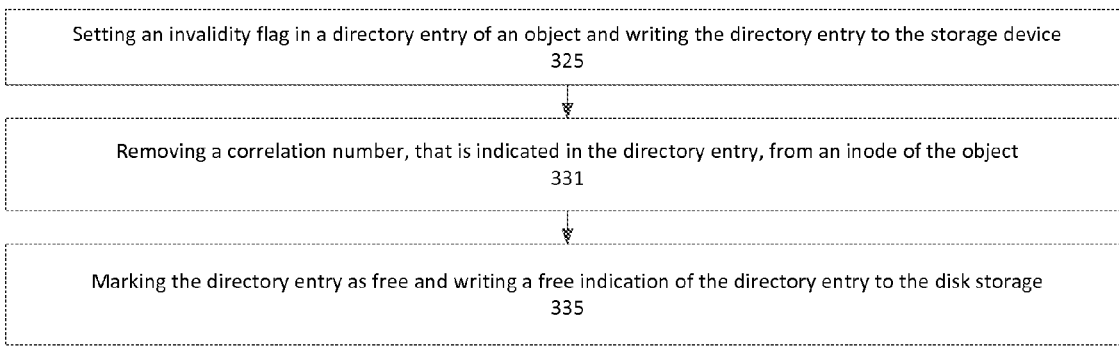

FIG. 3D illustrates a set of operations 303 for removing a hard link to an object. Removing a hard link 303 includes operations 325 and 335 as in FIG. 3B, but instead of operation 330, removing a hard link 303 includes an operation 331 of removing the additional first correlation value (indicative of the directory entry associated with the hard link), from the inode of the object. Note that the removing of the additional first correlation value from the inode is performed before freeing the directory entry of the hard link.

Figure 3E:
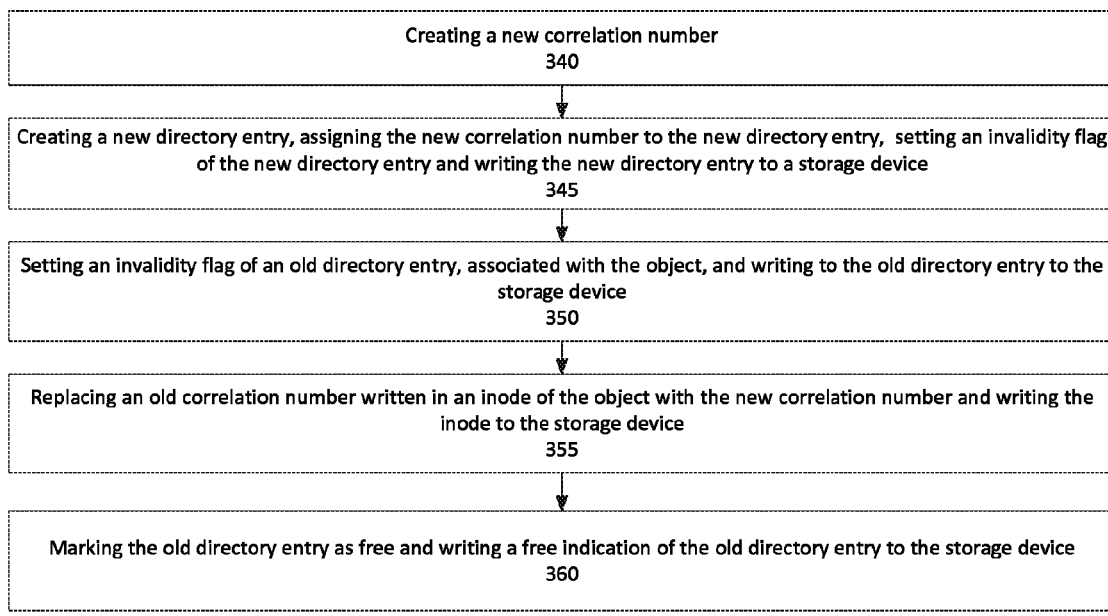

FIG. 3E illustrates a set of operations 304 for moving an object from one directory (hereinafter 'the old directory') to another directory (hereinafter 'the new directory'). The first operation 340 is of creating a new first and second correlation values that will replace the previously used correlation values.

Operation 340 is followed by an operation 345 of generating a new directory entry in the new directory, and configuring the new directory entry to comprise the inode identification of the inode, a new second correlation value and an inconsistency indication and writing the new directory entry to a non-volatile storage space.

Operation 345 is followed by an operation 350 of setting an inconsistency indication of an old directory entry that reside in the old directory, associated with the object, and writing the old directory entry to the storage space.

Operation 350 is followed by an operation 355 of replacing the first correlation value (indicative of the old directory entry) written in the inode of the object with the new first correlation value corresponding to the new second correlation value and writing the inode to the storage space. Note that operation 355 of replacing is succeeding the operation 345 of generating.

Operation 355 is followed by an operation 360 of deleting the old directory entry, which may include marking the old directory entry as free and writing a free indication of the old directory entry to the storage space. Note that operation 360 of deleting is succeeding the operation 355 of replacing.

Figure 4:
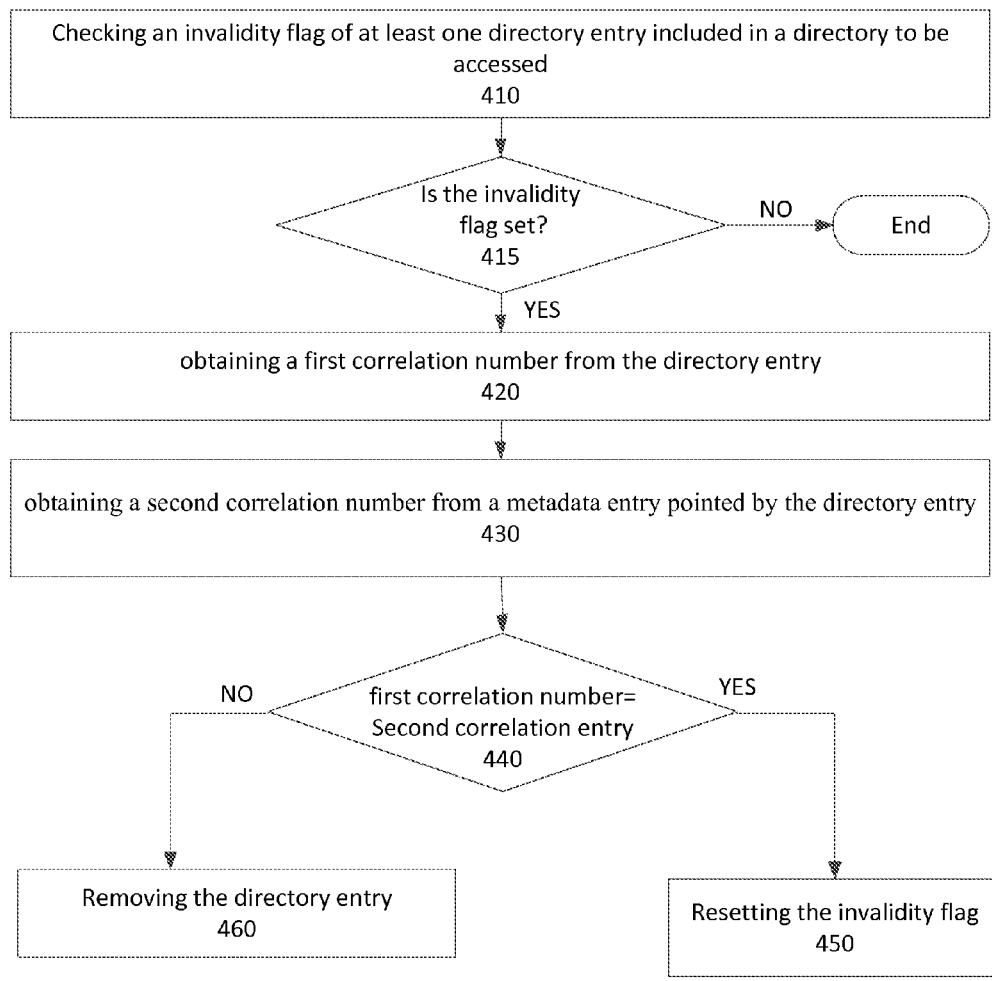
FIG. 4 illustrates a generalized flowchart of detecting and fixing stale directory entries, in accordance with certain embodiments of the presently disclosed subject matter.

FIG. 4 illustrates a set of operations 400 for on-going detection and fixing stale directory entries. The detection and fixing stale directory entries is performed as part of directory access, such as directory scan, directory read, etc. The first operation 410 is of checking whether an inconsistency indication is set in a directory entry included in a directory to be accessed. The inconsistency indication indicates a need to verify successful completion of a previous operation. If the inconsistency indication is set, as indicated in decision 415, the next operations are executed. The operations of FIG. 4 can follow the operations in any of FIGS. 3A-3E and are performed upon a first access to the directory entry, subsequent to any of the transactions described in FIGS. 3A-3E.

Operation 420 includes obtaining the second correlation value from the directory entry.

Operation 430 includes obtaining the first correlation value from the inode pointed by the directory entry (by the inode identifier).

Operation 440 includes verifying consistency between the directory entry and the inode, by checking whether the first correlation value matches the second correlation value.

If the two correlation values match, then operation 440 is followed by an operation 450 of resetting the inconsistency indication, so as to indicate a valid directory entry.

If the first correlation value does not match the second correlation value, then the sequence of operations continues with an operation 460 of deleting the directory entry from the directory. Operation 460 is also executed if the obtaining of the second correlation value fails (because the inode does not exist anymore).

FIG. 5 illustrates a set of operations 500 for maintaining consistency among metadata elements (MDEs) of logical objects. The metadata elements involved are at least two correlated elements: a parent metadata element and a child metadata element, both associated with the same logical object, wherein the parent metadata element includes a reference to the child metadata element. Non-limiting examples of metadata elements includes: (i) an inode that includes metadata information of the logical object; (ii) a directory entry that includes a reference to an inode, wherein the reference is an inode number; (iii) an indirect block referred by the inode and includes pointers to data blocks; or (iv) any other metadata component that is related to the logical object. FIG. 5 includes operations performed as part of a transaction that includes write operations to both metadata elements and operations performed routinely for detecting and fixing inconsistencies that may occur when transactions are interrupted during execution. The operations of FIG. 5 can be performed by processor 121.

The set of operations 500 includes operation 510 of assigning to the parent metadata element an inconsistency indication, indicative of potential inconsistency between the parent metadata element and the child metadata element. Operation 510 is executed before performing transaction's write operations or as part of the first write operation, if the writing is to the parent metadata element. The parent metadata element with the assigned inconsistency indication is written to a non-volatile storage space either in operation 510 or as part of operation 540.

The set of operations 500 includes operation 520 of configuring the child metadata element, associated with the logical object, to comprise a first correlation value uniquely indicative of the parent metadata element associated with the logical object. The configuring may include assigning the same correlation value to both the child metadata structure and the parent metadata structure. Alternatively, the configuring may include: (i) configuring the child metadata to comprise the first correlation value; and (ii) configuring the parent metadata to comprise a second correlation value that is correlated to the first correlation value; The first and second correlation values matches (or correlated to) each other, by being equal to each other or by being derivable or inferable one from the other. Accordingly, the first correlation value can be uniquely indicative of the parent metadata element, by being equal to the second correlation value in the parent metadata element, by being derivable or inferable from the second correlation value, by being inferable from any other value included in the parent metadata element, etc.

Operation 520 is executed upon transactions that involve a creation of a parent metadata element, e.g. a directory entry.

Non-limiting examples of transactions that involve a creation of a directory entry includes: logical object creation, logical object moving and hard link creation. In the latter two cases, an already existing inode is configured to include a first correlation value indicative of the newly created directory entry (i.e. the new directory entry that serves the created hard link or the directory entry that is created under the new directory that is requested for hosting the moved file).

Operation 520 can be executed as part of an inode creation operation, which takes place in a logical object creation transaction. The inode is configured to include the first correlation value. Operation 520 can be executed as part of file moving operation, in which case a previous first correlation value that was associated with a previous hosting directory and included in the inode is replaced with a new first correlation value indicative of a newly created directory entry. Operation 520 can be executed as part of creating a hard link operation, in which case the first correlation value is added to other correlation values that may exist in the inode of the file pointed by the hard link.

The write operations described herein are operations in which a metadata element, either a new one or an updated metadata element is written to a non-volatile storage space. Another example of a writing operation related to a metadata element is writing to the non-volatile storage space an indication that the metadata element is deleted. The write operations are for creation, updating and deletion operations of metadata structures.

Operations 510 and 520 are followed by an operation 530 of determining an order of performing at least two write operations included in a transaction related to the logical object: at least one write operation with respect to the parent metadata element and at least one write operation with respect to the child metadata element; wherein the determined order guarantees that the child metadata element exists and includes the first correlation value indicative of the parent metadata element, as long as the parent metadata element exists, i.e. at no point in time, does the child metadata element exist in the storage space or is correlated to the parent metadata element, while the parent metadata element does not exist anymore in the storage space.

Non-limiting examples of transactions that are applicable to operation 530 are: logical object deletion, logical object creation, renaming the logical object, moving the logical object, creating a hard link and deleting a hard link.

In case where operation 530 is executed for a transaction of logical object creation, the determining of the order of performing the write operations includes determining that a creation operation of the directory entry in a non-volatile storage space is performed before a creation operation of the inode in the non-volatile storage space.

In case where operation 530 is executed for a transaction of logical object deletion the determining of the order of performing the write operations includes determining that a deletion operation of the directory entry from a non-volatile storage space is performed after a deletion operation of the inode from a non-volatile storage space.

In case where operation 530 is executed for a transaction of logical object moving, the determining of the order of performing the write operations includes performing the following operations in the following order: (i) a creation operation of the new directory entry, under the new directory, in a non-volatile storage space; (ii) replacing an old correlation value indicative of the old directory entry and included in the inode with a new correlation value indicative of the new directory entry and write the inode to the non-volatile storage space; and (iii) deleting the old directory entry from the non-volatile storage space. The old directory entry is a directory entry in the directory, under which the logical object was hosted prior to the moving.

In case where operation 530 is executed for a transaction of adding a hard link that points to the logical object, the determining of the order of performing the write operations includes performing the following operations in the following order: (i) a creation operation of a new directory entry, related to the hard link, in a non-volatile storage space; (ii) adding the first correlation value indicative of the new directory entry to the inode and writing the inode to the non-volatile storage space.

Operation 530 is followed by an operation 540 of performing the at least two write operations according to the determined order. If a write operation of a parent metadata element is determined to be the first operation, then the inconsistency indication is written to the non-volatile storage space as part of writing other parameters of the parent metadata element. If the transaction is creating a logical object or moving a logical object, then the second correlation value, included in the parent metadata element, is also written to the non-volatile storage space at operation 540. The first correlation value can also be written to the non-volatile storage space, at this operation, in case where the transaction involves creation of a parent metadata element.

Upon performing a first access to the parent data element, subsequent to the transaction, The set of operations 500 includes operation 560 that includes verifying consistency between the parent metadata element and the child metadata element, by using the first correlation value included in the child metadata element.

If the verification is unsuccessful, i.e. in case where the first correlation value is not indicative of the parent metadata element (e.g. if the first correlation value does not match the second correlation value), operation 560 is followed by operation 570 of removing the parent metadata element, for example, deleting the directory entry from the directory.

If the verification is successful, i.e. in case where the first correlation value is indicative of the parent metadata element (e.g. if the first correlation value matches the second correlation value), operation 560 is followed by operation 580 of removing the inconsistency indication from the parent metadata element.

Operations 560-580 may be executed only if the inconsistency indication exists in the parent metadata element.

Operations 560-580 can be performed while scanning the directory that includes the directory entry. The scanning can be performed when reading the directory for displaying purposes or when traversing the directory tree for various purposes.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception

The invention claimed is:

1. A method for maintaining consistency among metadata elements (MDEs) of logical objects, the method comprising:
   using a processor of an object management system to perform the following steps, the processor is operatively coupled to a non-volatile storage space accessible by the processor and configured to store the MDEs:
   a) configuring for each logical object of the logical objects, a child MDE, comprising a first correlation value, that associates the child MDE to a parent MDE, wherein the parent MDE includes a reference to the child MDE, and assigning to the parent MDE an inconsistency indication, indicative of potential inconsistency between a certain parent MDE and a certain child MDE;
   b) in response to receiving by the object management system, from a host coupled to the object management system, a filesystem command addressed to certain logical object, performing a transaction related to the certain logical object that is associated with the certain parent MDE and the certain child MDE, wherein the transaction includes at least one first write operation with respect to the certain parent MDE and at least one second write operation with respect to the certain child MDE; wherein the performing comprises determining an order of performing the at least one first and second write operations such that at no point in time during the transaction the certain child MDE comprises a certain first correlation value that associates the certain child MDE to a non-existing parent MDE; and
   c) upon an access to the certain parent MDE, that follows the performing of the transaction, verifying consistency between the certain parent MDE and the certain child MDE when the certain parent MDE includes the inconsistency indication, using the certain first correlation value; deleting the certain parent MDE when the verifying of consistency is unsuccessful; and removing the inconsistency indication from the certain parent MDE when the verifying is successful.

2. The method of claim 1 wherein the certain parent MDE is a directory entry and the certain child MDE is an inode (index node).

3. The method of claim 2, wherein the performing of the transaction comprises creating an inode that comprises the certain first correlation value.

4. The method of claim 2, wherein the transaction is for creating the certain logical object, wherein the at least one first write operation comprises a creation operation of the directory entry in the non-volatile storage space and the at least one second write operation comprises a creation operation of the inode in the non-volatile storage space, and wherein the performing comprises determining that the creation operation of the directory entry is performed before the creation operation of the inode.

5. The method of claim 2, wherein the transaction is for deleting the certain logical object, wherein the at least one first write operation comprises a deletion operation of the directory entry from the non-volatile storage space and the at least one second write operation comprises a deletion operation of the inode from the non-volatile storage space, and wherein the performing comprises determining that the deletion operation of the directory entry is performed after the deletion operation of the inode.

6. The method of claim 2, wherein the access to the certain parent MDE is a first access to the directory entry and provided responsive to scanning a directory that comprises the directory entry.

7. The method of claim 1 further comprising configuring each parent MDE to comprise a second correlation value that corresponds to the first correlation value wherein the verifying is considered as unsuccessful if the first correlation value does not match the second correlation value.

8. The method of claim 1, wherein the transaction is selected from: a logical object creation, a hard link creation and a logical object moving and wherein the performing comprises creating the certain first correlation value.

9. The method of claim 1, wherein the transaction is for moving the certain logical object, wherein the certain parent MDE is an old directory entry associated with the certain logical object and wherein the certain child MDE is an inode; and wherein the performing comprises determining performing the following operations in the following order: (i) a creation operation of a new directory entry in the non-volatile storage space; (ii) replacing the certain first correlation value that is included in the inode with a new first correlation value that associates the inode with the new directory entry and writing the inode to the non-volatile storage space; and (iii) deleting the old directory entry from the non-volatile storage space.

10. The method of claim 1, wherein the transaction is for adding a hard link that points to the certain logical object, wherein the certain parent MDE is a directory entry associated with the hard link and wherein the certain child MDE is an inode associated with the certain logical object and the hard link; and wherein the performing comprises determining performing the following operations in the following order: (i) a creation operation of the directory entry in the non-volatile storage space; (ii) adding the certain first correlation value to the inode and writing the inode to the non-volatile storage space.

11. The method of claim 1, wherein the performing comprises determining the order such that the at least one first write operation with respect to the certain parent MDE precedes a second write operation that includes creating the certain first correlation value of the certain child MDE.

12. The method of claim 1, wherein the performing comprises determining that a first write operation related to deleting the certain parent MDE succeeds a second write operation related to deleting the certain first certain correlation value of the certain child MDE.

13. A method for maintaining consistency among metadata elements of logical objects, the method comprising:
   using a processor of an object management system to perform the following steps, the processor is operatively coupled to a non-volatile storage space accessible by the processor and configured to store the metadata elements:
   a) in response to receiving by the object management system, from a host coupled to the object management system, a filesystem command for creating a logical object:
      i. generating, in the non-volatile storage space, a directory entry associated with the logical object and configuring the directory entry to comprise a second correlation value and an inconsistency indication indicative of potential inconsistency between the directory entry and an inode (index node); and
      ii. generating, in the non-volatile storage space, the inode associated with the logical object and configuring the inode to comprise a first correlation value corresponding to the second correlation value;

wherein the step of generating the inode is succeeding the step of generating the directory entry;

b) upon an access to the directory entry, that follows the creating of the logical object, verifying consistency between the directory entry and the inode when the directory entry includes the inconsistency indication, by checking a match between the first correlation value and the second correlation value; deleting the directory entry when the verifying of consistency is unsuccessful; and removing the inconsistency indication from the directory entry when the verifying is successful.

14. The method of claim 13 further comprising: deleting the logical object, wherein the deleting comprises freeing the inode before freeing the directory entry.

15. The method of claim 13 further comprising:
a) creating a hard link to the logical object, the creating of the hard link comprises:
 i) generating, in the non-volatile storage space, a new directory entry associated with the hard link and configuring the new directory entry to comprise a new second correlation value and an inconsistency indication indicative of potential inconsistency between the new directory entry and the inode;
 ii) configuring the inode to comprise an additional first correlation value corresponding to the new second correlation value and writing the inode to the non-volatile storage space; wherein the step of configuring the inode is succeeding the step of generating the new directory entry;
b) upon a first access to the new directory entry, subsequent to the creating of the hard link, in case where the new directory entry comprises the inconsistency indication, verifying consistency between the new directory entry and the inode, by checking a match between the additional first correlation value and the new second correlation value; and deleting the new directory entry if the verifying of consistency is unsuccessful.

16. The method of claim 15 further comprising: removing the hard link, wherein the removing of the hard link comprises removing the additional first correlation value from the inode before freeing the new directory entry.

17. The method of claim 13 further comprising:
a) moving the logical object to another directory, wherein the moving comprises:
 i) generating a new directory entry associated with the logical object in the non-volatile storage space and configuring the new directory entry to comprise a new second correlation value and an inconsistency value indicative of potential inconsistency between the new directory entry and the inode;
 ii) replacing in the inode, the first correlation value with a new first correlation value corresponding to the new second correlation value, wherein the step of replacing is succeeding the step of generating;
 iii) deleting from the non-volatile storage space, an old directory entry associated with the logical object; wherein the step of deleting is succeeding the step of replacing; and
b) upon a first access to the new directory entry, subsequent to the moving, in case where the new directory entry comprises the inconsistency indication, verifying consistency between the new directory entry and the inode, by checking a match between the new first correlation value and the new second correlation value; and deleting the new directory entry if the verifying of consistency is unsuccessful.

18. A non-transitory computer storage medium having computer readable program code embodied therein for maintaining consistency among metadata elements (MDEs) of logical objects, the computer program product comprising:
computer readable program code that once being executed on a processor of an object management system causes the processor to:
a) configuring for each logical object of the logical objects, a child MDE, comprising a first correlation value, that associates the child MDE to a parent MDE, wherein the parent MDE includes a reference to the child MDE, and assigning to the parent MDE an inconsistency indication, indicative of potential inconsistency between a certain parent MDE and a certain child MDE;
b) in response to receiving by the object management system, from a host coupled to the object management system, a filesystem command addressed to certain logical object, performing a transaction related to the certain logical object that is associated with the certain parent MDE and the certain child MDE, wherein the transaction includes at least one first write operation with respect to the certain parent MDE and at least one second write operation with respect to the certain child MDE; wherein the performing comprises determining an order of performing the at least one first and second write operations such that at no point in time during the transaction the certain child MDE comprises a certain first correlation value that associates the certain child MDE to a non-existing parent MDE; and
c) upon an access to the certain parent MDE, that follows the performing of the transaction, verifying consistency between the certain parent MDE and the certain child MDE when the certain parent MDE includes the inconsistency indication, using the certain first correlation value; deleting the certain parent MDE when the verifying of consistency is unsuccessful; and removing the inconsistency indication from the certain parent MDE when the verifying is successful.

* * * * *